United States Patent
Hong et al.

(10) Patent No.: US 9,938,168 B2
(45) Date of Patent: Apr. 10, 2018

(54) APPARATUS AND METHOD FOR WATER TREATMENT USING IN-SITU ACTIVATION OF MANGANESE DIOXIDE CATALYST

(71) Applicant: Korea Institute of Science and Technology, Seoul (KR)

(72) Inventors: Seok Won Hong, Seoul (KR); Kang Woo Cho, Seoul (KR); Yunchul Chung, Seoul (KR); Sanghyup Lee, Seoul (KR); Boyoung Jeong, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 15/052,085

(22) Filed: Feb. 24, 2016

(65) Prior Publication Data

US 2016/0264433 A1    Sep. 15, 2016

(30) Foreign Application Priority Data

Mar. 13, 2015 (KR) ........................ 10-2015-0035016

(51) Int. Cl.
*C02F 1/467* (2006.01)
*C02F 1/461* (2006.01)
*C02F 101/36* (2006.01)

(52) U.S. Cl.
CPC ........ *C02F 1/4672* (2013.01); *C02F 1/46114* (2013.01); *C02F 2001/46142* (2013.01); *C02F 2101/36* (2013.01); *C02F 2201/46135* (2013.01)

(58) Field of Classification Search
CPC ................ C02F 1/46114; C02F 1/4672; C02F 2011/46142; C02F 2101/36; C02F 2201/46135
See application file for complete search history.

(56) References Cited

U.S. PATENT DOCUMENTS 3,728,238 A * 4/1973 Tarjanyi ................... C02F 1/46
205/750
4,551,254 A * 11/1985 Imada .................... C01G 45/02
210/263

(Continued)

FOREIGN PATENT DOCUMENTS

JP        7-68277 A     3/1995
JP        7-118019 A    5/1995

(Continued)

OTHER PUBLICATIONS

Rodríguez, Eva, et al. "Oxidation of Microcystins by Permanganate: Reaction Kinetics and Implications for Water Treatment." Water Research 41.1 (2007): 102-110.

*Primary Examiner* — Ciel P Thomas
(74) *Attorney, Agent, or Firm* — NSIP Law

(57) ABSTRACT

The apparatus for water treatment using in-situ activation of a manganese dioxide catalyst includes: a reaction bath configured to give a space where aqueous organic contaminants are removed by means of reaction with permanganate ($MnO_4^-$) generated by electrochemical oxidation of manganese oxide ($MnO_2$); a plurality of manganese dioxide catalysts provided at the reaction bath and electrochemically oxidized into permanganate ($MnO_4^-$) by a voltage applied thereto; and a power supply device configured to apply power to the manganese dioxide catalyst so that the manganese dioxide ($MnO_2$) is electrochemically oxidized into permanganate ($MnO_4^-$).

13 Claims, 3 Drawing Sheets

(56) References Cited

U.S. PATENT DOCUMENTS

| | | | | |
|---|---|---|---|---|
| 4,834,847 A * | 5/1989 | McIntyre | ........... | C25B 3/06 |
| | | | | 204/263 |
| 4,853,095 A * | 8/1989 | D'Ambrisi | ........... | C25B 1/28 |
| | | | | 205/475 |
| 2005/0135993 A1* | 6/2005 | Xu | ........... | H01M 4/505 |
| | | | | 423/605 |
| 2013/0040806 A1* | 2/2013 | Dismukes | ........... | B01J 35/004 |
| | | | | 502/159 |
| 2013/0075313 A1* | 3/2013 | Handy | ........... | C02F 1/42 |
| | | | | 210/141 |
| 2014/0332406 A1* | 11/2014 | Nottke | ........... | C25F 7/00 |
| | | | | 205/763 |
| 2015/0008186 A1* | 1/2015 | Sempere-Belda | ........ | C02F 1/28 |
| | | | | 210/666 |
| 2015/0344327 A1 | 12/2015 | Ko et al. | | |

FOREIGN PATENT DOCUMENTS

| | | |
|---|---|---|
| JP | 09066284 A * | 3/1997 |
| JP | 2004-25122 A | 1/2004 |
| JP | 2008-43898 A | 2/2008 |
| JP | 2014-92442 A | 5/2014 |
| KR | 10-2013-0112971 A | 10/2013 |
| KR | 10-1386599 B1 | 4/2014 |
| KR | 10-1473923 B1 | 12/2014 |
| KR | 10-1473924 B1 | 12/2014 |
| WO | WO 03/011769 A2 | 2/2003 |
| WO | WO 2004/067161 A2 | 8/2004 |

* cited by examiner

APPARATUS AND METHOD FOR WATER TREATMENT USING IN-SITU ACTIVATION OF MANGANESE DIOXIDE CATALYST

CROSS-REFERENCE TO RELATED APPLICATION

This application claims priority to Korean Patent Application No. 10-2015-0035016, filed on Mar. 13, 2015, and all the benefits accruing therefrom under 35 U.S.C. § 119, the contents of which in its entirety are herein incorporated by reference.

BACKGROUND

1. Field

The present disclosure relates to an apparatus and method for water treatment using in-situ activation of a manganese dioxide catalyst, and more particularly, to an apparatus and method for water treatment using in-situ activation of a manganese dioxide catalyst, which generates a permanganate by means of electrochemical oxidation of manganese dioxide, and allows the permanganate to react with organic contaminants so as to remove the organic contaminants with the permanganate being reduced into manganese dioxide again, thereby effectively removing aqueous organic contaminants and preventing reaction byproducts from being generated.

Explanation on the Government-Supported Research and Development

This study has been supported by the technical development business for social issue responding of the Ministry of Science, ICT and Future Planning, supervised by the Korea Institute of Science and Technology, and the title of this study is Development of oxidizer and processing technique for advanced purification against the occurrence of algal bloom (Study Serial Number: 1711009999).

2. Description of the Related Art

Recently, along with the change of lifestyle of humankind and the advancement of analysis technique, Contaminants of Emerging Concern (CECs) which have not been considered in existing environmental remediation processes are receiving attention. The CECs contains Pharmaceutical and Personal Care Products (PPCPs), Endocrine Disruption Compounds (EDCs), Perfluorinated Compounds (PFCs) or the like, and these substances are known to give serious influences on the ecosystem when being introduced into the environments. In addition, due to recent climate changes, abnormal temperature and rainfall decline occur frequently, and algal bloom caused by mass propagation of the blue-green algae has become a social issue, and particularly there is an increasing concern on toxic substances including neurotoxin (anatoxin or hepatotoxin) such as microcystin or nodularin, produced by the blue-green algae such as Microcystis, Anabaena, Oscillatoria or the like, which are found in domestic reservoirs.

As a method for removing trace-level harmful aqueous substances as described above, an adsorption method based on activated carbon and a chemical method using various oxidizer chemicals (chlorine, ozone, permanganate or ferrite) are being widely used at the present. In the adsorption method using activated carbon, since organic contaminants are selectively adsorbed depending on a pore size of the activated carbon, it is difficult to remove contaminants with various molecular sizes together, and when an adsorbent is saturated, the absorbent should be regenerated, but highly concentrated harmful substances may be detached during the regeneration process, which may cause secondary contamination. In the chemical method using an oxidizer, expensive ozone generating device is required, and if chlorine (hypochlorous acid) is used, chlorinated byproducts such as trihalomethane (THMs) and haloacetic acids (HAAs) are generated.

Meanwhile, a method for oxidizing aqueous organic contaminants using a permanganate is being studied as an alternative method of the ozone and the chlorine. For example, there has been reported an experiment result in which 1 to 1.25 ppm of permanganate is used to remove three kinds of microcystins (MC-LR, -RR, -YR) to 1 ug/L or below, which is a criterion of the World Health Organization, within several hours to reduce toxicity (Rodriguez et al., Oxidation of microcystins by permanganate: Reaction kinetics and implications for water treatment, 2007, Water Research, 41 (1), pp. 102-110). However, in spite of a lower price in comparison to ozone and lower possibility of toxic byproducts formation in comparison to chlorine, the oxidation method using a permanganate requires handling a dangerous chemical potassium permanganate, and generates manganese oxide-enriched sludge.

As another alternative technique, a water treatment method (Korean Patent Registration No. 1386599, Korean Patent Registration No. 1473923) in which manganese dioxide ($MnO_2$), relatively safe in terms of handling, is fixed as an oxidizing agent to a support has been proposed. However, in this method, oxidizing power of manganese dioxide is deteriorated due to an inhibition of $Mn^{2+}$ generated as byproducts, with generating pink color in the water. As another alternative, there is a technique for re-oxidizing $Mn^{2+}$ using biological activities (Korean Patent Registration No. 1473924), but this technique still demands long hydraulic residence time of several days due to low oxidizing power of manganese dioxide ($MnO_2$).

RELATED LITERATURES

Patent Literature

Korean Patent Registration No. 1386599
Korean Patent Registration No. 1473923
Korean Patent Registration No. 1473924

Non-Patent Literature

Rodriguez et al. Oxidation of microcystins by permanganate: Reaction kinetics and implications for water treatment, 2007, Water Research, 41 (1), pp. 102-110

SUMMARY

The present disclosure is directed to providing an apparatus and method for water treatment using in-situ activation of a manganese dioxide catalyst, which may generate a permanganate by means of electrochemical oxidation of manganese dioxide, and allow the permanganate to react with organic contaminants so as to remove the organic contaminants and reduce the permanganate into manganese dioxide again, thereby effectively removing aqueous organic contaminants and preventing reaction byproducts from being generated.

In one aspect, there is provided an apparatus for water treatment using in-situ activation of a manganese dioxide catalyst, the apparatus comprising: a reaction bath configured to give a space where aqueous organic contaminants are removed by means of an electrochemical oxidation reaction of manganese dioxide ($MnO_2$) and a subsequent reduction reaction of permanganate ($MnO_4^-$) reacting with the organic contaminants; a plurality of manganese dioxide catalysts provided at the reaction bath and electrochemically oxidized into permanganate ($MnO_4^-$) by a voltage applied thereto; and a power supply device configured to apply power to the manganese dioxide catalyst so that the manganese dioxide ($MnO_2$) is electrochemically oxidized into permanganate ($MnO_4^-$).

The power supply device may include a positive electrode (+) provided between the manganese dioxide catalysts of the reaction bath to apply a positive (+) potential so that the manganese dioxide is guided to be oxidized into permanganate ($MnO_4^-$), a negative electrode (−) provided out of the reaction bath to retrieve an electron and transfer the electron to a final electron acceptor, a power supply unit configured to apply power to the positive electrode (+) and the negative electrode (−), and a voltage adjuster configured to adjust a voltage applied to the positive electrode (+).

The positive electrode (+) and the negative electrode (−) may be repeatedly disposed at regular intervals, the positive electrode (+) and the negative electrode (−) may be connected in parallel, and voltage may be uniformly distributed to the positive electrode (+) and the negative electrode (−) connected in parallel, by means of the voltage adjuster.

The manganese dioxide catalyst may include a support, and manganese dioxide particles provided on a surface of the support. The support may be made of any one of activated carbon, activated carbon fiber, zeolite, perlite and anthracite. In addition, the manganese dioxide catalyst may be manganese dioxide particles, and the manganese dioxide particles may be made of β-$MnO_2$ having a rutile crystal structure.

The manganese dioxide catalyst may be prepared by chemical or thermal treatment of sand particles to which amorphous manganese oxide is absorbed, so that the amorphous manganese oxide is oxidized into crystalline manganese dioxide. In the chemical treatment, potassium permanganate ($KMnO_4$) or sodium hypochlorite ($NaOCl$) may be used to oxidize the amorphous manganese oxide into crystalline manganese dioxide.

The manganese dioxide catalyst may be prepared by putting and stirring a support to a precursor solution containing manganese chloride ($MnCl_2$) and potassium permanganate ($KMnO_4$) so that y a reaction between manganese chloride ($MnCl_2$) and potassium permanganate ($KMnO_4$) generates amorphous manganese oxide on a surface of the support, and a thermal treatment may oxidize the amorphous manganese oxide into manganese dioxide.

The manganese dioxide catalyst may be prepared by electrospraying or electrospinning manganese dioxide particles on a support.

A method for water treatment using in-situ activation of a manganese dioxide catalyst according to the present disclosure may include: supplying raw water to a reaction bath having a manganese dioxide catalyst and applying a voltage to the manganese dioxide catalyst to electrochemically oxidize the manganese dioxide ($MnO_2$) into permanganate ($MnO_4^-$); and allowing the generated permanganate ($MnO_4^-$) to react with organic contaminants in the raw water to oxidize the organic contaminants and reduce the permanganate ($MnO_4^-$) back into manganese dioxide ($MnO_2$).

A voltage demanded for electrochemical oxidation of the manganese dioxide into permanganate ($MnO_4^-$) may be determined according to a following formula.

$$E = E^0 - 0.079 \times pH \quad \text{Formula}$$

(E represents a voltage applied to the positive electrode, and $E^0$ represents a standard oxidation-reduction potential)

The apparatus and method for water treatment using in-situ activation of a manganese dioxide catalyst gives the following effects.

Since manganese dioxide is electrochemically oxidized into a permanganate and the generated permanganate reacts with organic contaminants to remove the organic contaminants and reduce the permanganate back into manganese dioxide, aqueous organic contaminants may be effectively removed without handling a dangerous chemical, and reaction byproducts may be minimally generated.

DETAILED DESCRIPTION

The present disclosure proposes a technique for electrochemical oxidation of a manganese dioxide ($MnO_2$) catalyst to produce permanganate ($MnO_4^-$), and allowing the produced permanganate ($MnO_4^-$) to react with aqueous organic contaminants so that the organic contaminants are oxidized and removed and also the permanganate ($MnO_4^-$) is guided to be reduced back to manganese dioxide ($MnO_2$). Since the process of oxidizing manganese dioxide ($MnO_2$) into permanganate ($MnO_4^-$) and reducing permanganate ($MnO_4^-$) back into manganese dioxide ($MnO_2$) is repeatedly performed, aqueous organic contaminants may be removed without a consistent supply of a external oxidizing agent, and since the reduced manganese dioxide ($MnO_2$) is re-oxidized into permanganate ($MnO_4^-$), it is possible to minimize the generation of reaction byproducts such as manganese ion (II) and manganese dioxide sludge.

Hereinafter, an apparatus and method for water treatment using in-situ activation of a manganese dioxide catalyst according to an embodiment of the present disclosure will be described in detail with reference to the accompanying drawings.

Figure 1:
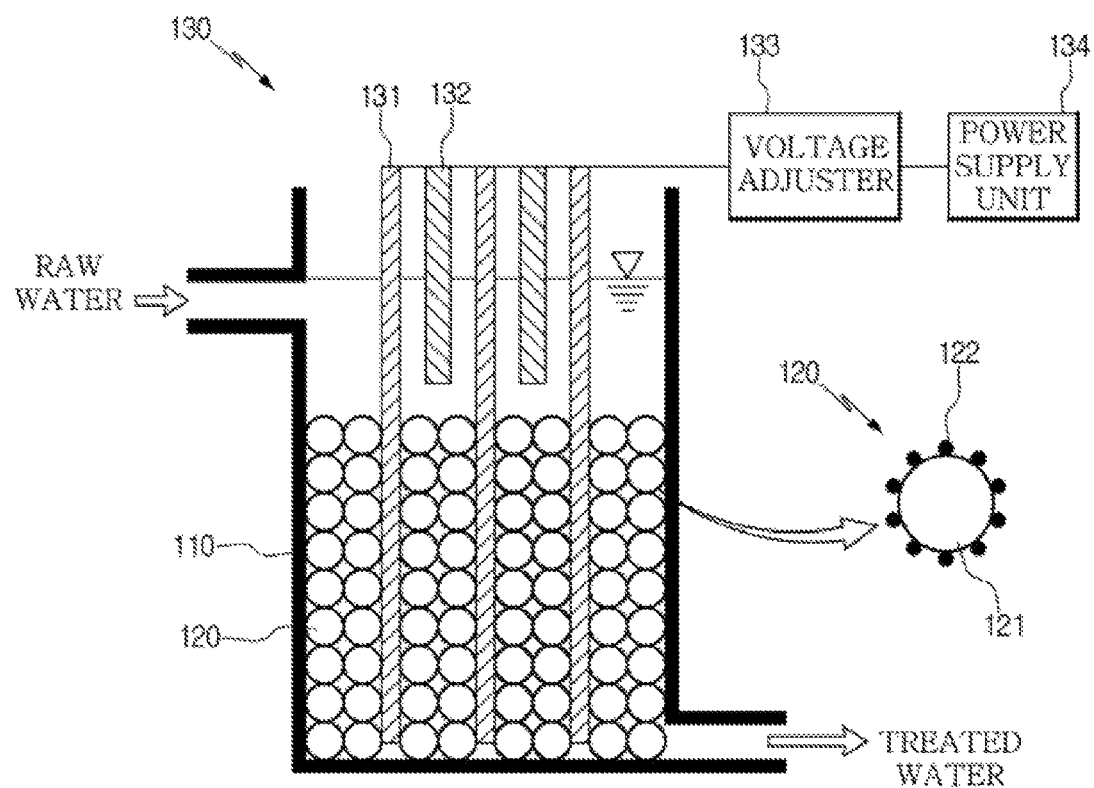
FIG. 1 is a diagram showing an apparatus for water treatment (hereinafter, also referred to as a water treatment apparatus) using in-situ activation of a manganese dioxide catalyst according to an embodiment of the present disclosure.

Referring to FIG. 1, the apparatus for water treatment using oxidation and reduction of a manganese dioxide catalyst according to an embodiment of the present disclosure includes a reaction bath 110.

The reaction bath 110 gives a space where organic contaminants included in raw water are removed by means of a reaction with permanganate ($MnO_4^-$) generated by an electrochemical oxidation of manganese dioxide. In the reaction bath 110, a manganese dioxide catalyst 120 is provided. The manganese dioxide catalyst 120 is oxidized into permanganate ($MnO_4^-$) by a voltage applied thereto, and the permanganate ($MnO_4^-$) plays a role of oxidizing organic contaminants in the raw water.

The manganese dioxide catalyst 120 may be made of manganese dioxide particles or a combination of a support 121 and manganese dioxide particles 122. If the manganese dioxide catalyst 120 is made of only manganese dioxide particles, $\beta$-$MnO_2$ having a rutile crystal structure may be used as the manganese dioxide particles. If the manganese dioxide catalyst 120 is made of a combination of the support 121 and the manganese dioxide particles 122, the manganese dioxide catalyst 120 is formed so that the manganese dioxide particles 122 are fixed onto the surface of the support 121.

The manganese dioxide catalyst 120 composed of the support 121 and the manganese dioxide particles 122 may be prepared using following methods. As the first method, sand particles to which an amorphous manganese oxide is absorbed may be chemically or thermally treated to oxidize the amorphous manganese oxide so that the manganese dioxide catalyst 120 having the manganese dioxide particles 122 formed on the surface of the sand particles is obtained. The sand particles to which an amorphous manganese oxide is absorbed may be naturally generated at an underground sedimentary layer or a sand filter bed of a water treatment plant, and the amorphous manganese oxide may be oxidized into manganese dioxide by means of chemical treatment using an oxidizer such as potassium permanganate ($KMnO_4$) and sodium hypochlorite ($NaOCl$) or thermal treatment where the amorphous manganese oxide is oxidized through thermal treatment.

As a second method, the support 121 may be put into and stirred in a precursor solution containing manganese chloride ($MnCl_2$) and potassium permanganate ($KMnO_4$) to form an amorphous manganese oxide by the reaction between manganese chloride ($MnCl_2$) and potassium permanganate ($KMnO_4$) on the surface of the support 121, and the amorphous manganese oxide is oxidized into manganese dioxide by means of thermal treatment to prepare the manganese dioxide catalyst 120 having the manganese dioxide particles 122 fixed to the support 121. As a third method, the manganese dioxide catalyst 120 having the manganese dioxide particles 122 fixed on the support 121 may also be prepared by electrospraying or electrospinning the manganese dioxide particles 122 onto the support 121.

A power supply device for applying power to the manganese dioxide catalyst 120 to electrochemically oxidize the manganese dioxide particles 122 so that the manganese dioxide particles 122 are guided to be oxidized into permanganate ($MnO_4^-$) is provided at one side of the reaction bath 110. In detail, the power supply device includes a positive electrode (+) 131, a negative electrode (−) 132, a voltage adjuster 133 and a power supply unit 134. The power supply unit 134 supplies power to the positive electrode (+) 131 and the negative electrode (−) 132, and the voltage adjuster 133 plays a role of adjusting the voltage applied to the positive electrode (+) 131. In addition, the positive electrode (+) 131 is in contact with the manganese dioxide catalysts 120 of the reaction bath 110 to apply a positive (+) voltage so that the manganese dioxide is guided to be oxidized into permanganate ($MnO_4^-$), and the negative electrode (−) 132 plays a role of retrieving an electron and transfer the electron to a final electron acceptor. The positive electrode (+) 131 is in contact with the manganese dioxide catalysts 120, but the negative electrode (−) 132 is not in contact with the manganese dioxide catalysts 120 so that the reduction reaction does not give any influence on the manganese dioxide catalysts 120.

In order to enhance oxidation efficiency of the manganese dioxide particles 122 into permanganate ($MnO_4^-$), a multiple number of the positive electrode (+) 131 and the negative electrode (−) 132 may be repeatedly disposed at regular distances, and when a plurality of positive electrodes (+) 131 and a plurality of negative electrodes (−) 132 are disposed, the positive electrodes (+) 131 and the negative electrodes (−) 132 may be connected in parallel, and voltage may be uniformly distributed to the positive electrodes (+) 131 and the negative electrode (−) 132, connected in parallel, by means of the voltage adjuster 133.

Now, operations of the apparatus for water treatment using in-situ activation of a manganese dioxide catalyst according to an embodiment of the present disclosure, configured as above, will be described.

Figure 2:
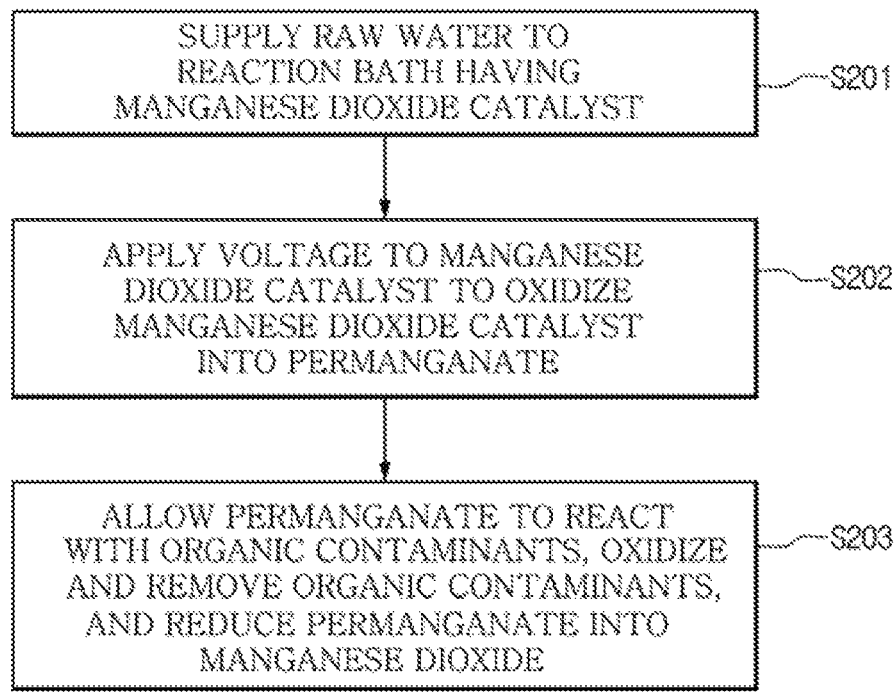
FIG. 2 is a flowchart for illustrating a method for water treatment (hereinafter, also referred to as a water treatment method) using in-situ activation of a manganese dioxide catalyst according to an embodiment of the present disclosure.

As shown in FIG. 2, in a state where raw water is supplied to the reaction bath 110 including the manganese dioxide catalysts 120 (S201), if a voltage is applied to the positive electrode (+) 131 in contact with the manganese dioxide catalysts 120, the manganese dioxide particles 122 of the manganese dioxide catalyst 120 are oxidized into permanganate ($MnO_4^-$) by means of electrochemical oxidization (see Formula 1 below) (S202). A standard oxidation-reduction potential required for electrochemical oxidation of the manganese dioxide particles 122 into permanganate ($MnO_4^-$) is 1.679V, which however may vary depending on pH of the raw water. In detail, the voltage applied through the positive electrode (+) 131 is determined according to Formula 3 below. For example, if the raw water has pH of 7, the voltage applied through the positive electrode (+) 131 is determined to be 1.127V.

Subsequently, the permanganate ($MnO_4^-$) produced by the electrochemical oxidation of the manganese dioxide ($MnO_2$) reacts with organic contaminants contained in the raw water, and by doing so, the organic contaminants are oxidized into carbon dioxide ($CO_2$) or the like and removed, and the permanganate ($MnO_4^-$) reacting with the organic contaminants is reduced back into manganese dioxide ($MnO_2$) (see Formula 2 below) (S203). If the permanganate ($MnO_4^-$) is reduced into manganese dioxide ($MnO_2$), this means that the manganese dioxide catalyst 120 returns to an initial state, namely to a state before the manganese dioxide catalyst 120 is electrochemically oxidized into permanganate ($MnO_4^-$). In other words, as an electrochemical oxidation process for oxidizing the manganese dioxide particles 122 into permanganate ($MnO_4^-$) and a reduction process for reducing the permanganate ($MnO_4^-$) into manganese dioxide by means of the reaction with organic contaminants are performed sequentially, the manganese dioxide catalyst 120 may be functioning for a number of times without deactivation.

$$MnO_2 + 2H_2O \rightarrow MnO_4^- + 4H^+ 3e^-, E^0 = 1.679 \text{ V} \qquad \text{Formula 1}$$

$$MnO_4^- + \text{Org.} \rightarrow MnO_2 + \text{Org.}_{ox} \qquad \text{Formula 2}$$

$$E = E^0 - 0.079 \times pH \qquad \text{Formula 3}$$

(E represents a voltage applied to the positive electrode, and $E^0$ represents a standard oxidation-reduction potential)

Since the manganese dioxide catalyst 120 may be reduced into an initial state by performing the electrochemical oxidation process for oxidizing the manganese dioxide particles 122 into permanganate ($MnO_4^-$) and the reduction process for reducing the permanganate ($MnO_4^-$) into manganese dioxide by means of the reaction with organic contaminants, the oxidation process and the reduction process may be repeatedly performed, which may allow continuous water treatment. In addition, since the manganese dioxide reduced back from the permanganate ($MnO_4^-$) may be still attached to the support 121, it is possible to minimize the generation of manganese dioxide sludge.

Figure 3:
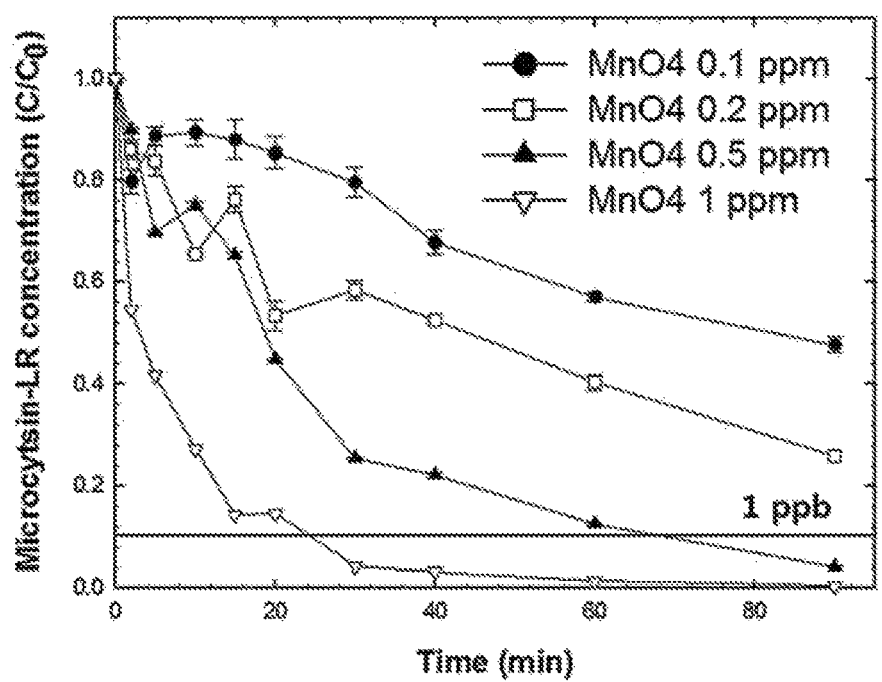
FIG. 3 shows removal efficiency of Microcystins-LR, which is an algal bloom-causing toxic substance, according to a concentration of permanganate.

Meanwhile, as the permanganate has a greater concentration, the aqueous organic contaminants may be removed more efficiently. FIG. 3 shows removal efficiency of Microcystins-LR, which is an algal bloom-causing toxic substance, under variable initial concentrations of the permanganate, and from this, it can be found that the removal efficiency of Microcystins-LR increases if the permanganate has a higher initial concentration. In the present disclosure, since the permanganate is continuously produced by repeating catalytic processes of manganese dioxide, aqueous organic contaminants may be continuously removed.

When the manganese dioxide catalyst is electrochemically oxidized, the magnitude of current may be calculated as a function of the amount of raw water to be treated. If the raw water has a flow rate of 10 m$^3$/day and a hydraulic residence time of 60 minutes, the reaction bath is demanded to have a volume of about 0.42 m$^3$, and in order to treat 0.1 g/day of Microcystins-LR, 100 g/day of permanganate is required. In this case, the required magnitude of current is determined to be about 2.12 A by means of Formula 4 below.

$$I = nFQ \quad \text{Formula 4}$$

(I represents a required magnitude of current, n represents the number of electrons required for the reaction of Formula 1, F represents a Faraday constant, and Q an generation rate (mol/sec) of permanganate)

| Reference Symbols | |
|---|---|
| 110: reaction bath | 120: manganese dioxide catalyst |
| 121: support | 122: manganese dioxide particles |
| 130: power supply device | |
| 131: positive electrode | 132: negative electrode |
| 133: voltage adjuster | 134: power supply unit |

What is claimed is:

1. An apparatus to treat water using in-situ activation of a manganese dioxide catalyst, the apparatus comprising:
   a reaction bath container configured to accommodate removal of aqueous organic contaminants by means of a reaction with permanganate ($MnO_4^-$);
   a manganese dioxide catalyst provided in the reaction bath container;
   positive electrodes and negative electrodes arranged in an alternating pattern; and
   a power supply device configured to apply power to the positive electrodes and the negative electrodes to electrochemically oxidize manganese dioxide ($MnO_2$) of the manganese dioxide catalyst into the permanganate ($MnO_4^-$),
   wherein the positive electrodes are longer than the negative electrodes and terminate inside the manganese dioxide catalyst,
   wherein the negative electrodes run parallel to the positive electrodes and terminate above the manganese dioxide catalyst, and
   wherein the manganese dioxide catalyst is provided as an immobilized packed bed that comprises manganese dioxide particles.

2. The apparatus according to claim 1, wherein the power supply device comprises
   a power supply unit configured to apply the power to the positive electrodes and the negative electrodes, and
   a voltage adjuster configured to adjust a voltage applied to the positive electrodes,
   the positive electrodes are configure to apply a positive voltage so that the manganese dioxide catalyst is guided to be oxidized into the permanganate ($MnO_4^-$),
   the negative electrodes are configured to retrieve an electron and transfer the electron to a final electron acceptor.

3. The apparatus according to claim 2, wherein
   the positive electrodes and the negative electrodes are disposed at regular intervals from one another,
   the positive electrodes and the negative electrodes are connected in parallel, and
   the voltage adjuster is configured to uniformly distribute voltage to the positive electrodes and the negative electrodes.

4. The apparatus according to claim 1, wherein the manganese dioxide catalyst comprises
   a support, and
   manganese dioxide particles provided on a surface of the support.

5. The apparatus according to claim 1,
   wherein the manganese dioxide catalyst is prepared by chemical or thermal treatment of sand particles to which amorphous manganese oxide is absorbed, so that the amorphous manganese oxide is oxidized into the manganese dioxide.

6. The apparatus according to claim 5,
   wherein when the amorphous manganese oxide is oxidized into the manganese dioxide ($MnO_2$), potassium permanganate ($KMnO_4$) or sodium hypochlorite (NaOCl) is used to oxidize the amorphous manganese oxide into the manganese dioxide ($MnO_2$).

7. The apparatus according to claim 1,
   wherein the manganese dioxide catalyst is prepared by putting and stirring a support to a precursor solution containing manganese chloride ($MnCl_2$) and potassium permanganate ($KMnO_4$) so that a reaction between the manganese chloride ($MnCl_2$) and the potassium permanganate ($KMnO_4$) generates amorphous manganese oxide on a surface of the support, and thermally treating the amorphous manganese oxide to be oxidized into manganese dioxide ($MnO_2$).

8. The apparatus according to claim 1,
   wherein the manganese dioxide catalyst is prepared by electrospraying or electrospinning manganese dioxide particles on a support.

9. The apparatus according to claim 1,
   wherein the manganese dioxide particles comprise β-$MnO_2$ having a rutile crystal structure.

10. An apparatus to treat water using in-situ activation of a manganese dioxide catalyst, the apparatus comprising:
    a reaction bath container configured to accommodate removal of aqueous organic contaminants by means of a reaction with permanganate ($MnO_4^-$);
    a manganese dioxide catalyst provided in the reaction bath container; and
    a power supply device configured to apply power to the manganese dioxide catalyst so that manganese dioxide ($MnO_2$) of the manganese dioxide catalyst is electrochemically oxidized into the permanganate ($MnO_4^-$);

wherein the power supply device comprises
a positive electrode extending from a first level above the manganese dioxide catalyst, and terminating inside the manganese dioxide catalyst at a second level, and
a negative electrode extending from the first level, parallel with the positive electrode, and terminating at a third level above the manganese dioxide catalyst, and
wherein the negative electrode is not in contact with the manganese dioxide catalyst.

11. The apparatus of claim 10, wherein the first and third levels are above a water level, and the second level is below the water level.

12. The apparatus of claim 10, wherein
the reaction bath container comprises
an inlet formed in a first wall of the reaction bath container,
an outlet formed in a second wall of the reaction bath container, and
the first level is above the inlet and above the outlet,
the second level is below the inlet, and
the third level is below the inlet and above the outlet.

13. An apparatus to treat water using in-situ activation of a manganese dioxide catalyst, the apparatus comprising:
a reaction bath container containing aqueous organic contaminants;
a manganese dioxide catalyst homogenously provided in a lower portion of the reaction bath, and absent from or non-homogenously provided in an upper portion of the reaction bath container; and
a power supply device configured to apply power to the manganese dioxide catalyst so that manganese dioxide ($MnO_2$) of the manganese dioxide catalyst is electrochemically oxidized into permanganate ($MnO_4^-$),
wherein the power supply device comprises
a positive electrode extending from a first level above the manganese dioxide catalyst, and terminating inside the manganese dioxide catalyst at a second level, and
a negative electrode extending from the first level, parallel with the positive electrode, and terminating at a third level above the manganese dioxide catalyst.

\* \* \* \* \*